United States Patent Office 3,338,683
Patented Aug. 29, 1967

3,338,683
PRODUCTION OF URANYL FLUORIDE
Albert Edgar Grant, Widnes, England, assignor to United Kingdom Atomic Energy Authority, London, England
No Drawing. Filed Jan. 6, 1965, Ser. No. 423,837
Claims priority, application Great Britain, Jan. 10, 1964, 1,314/64
3 Claims. (Cl. 23—346)

This invention relates to the production of uranyl fluoride from uranium hexafluoride.

The isotopes of uranium are separated on a large scale by gaseous diffusion of the hexafluoride which may then be converted to metal or oxide as required by formation of a series of intermediate compounds. One such intermediate compound is uranyl fluoride.

The present invention consists in a process for the production of uranyl fluoride which process comprises precipitating uranyl fluoride from a solution of uranium hexafluoride in anhydrous hydrogen fluoride by means of water and separating the precipitate from the mother liquor.

The water may be mixed with hydrogen fluoride. Preferably the azeotrope of hydrogen fluoride and water is used. The mother liquor is anhydrous hydrogen fluoride containing about 20 p.p.m. of uranyl fluoride. The precipitate may be separated from this mother liquor by centrifuging, decanting, filtering off the precipitate, or evaporating the anhydrous hydrogen fluoride.

It is an advantage of the present invention that it can make use of the azeotrope of hydrogen fluoride and water, which arises as a waste product in other uranium processes. It is also an advantage of the invention that an elevated temperature is not required and the reaction is brought about by mixing two solutions so that the reaction is easy to control. Furthermore, the process may be operated in such a way that hold up in the plant at the end of any operation is small compared with the throughput, thus simplifying changeover to a different uranium enrichment.

Anhydrous hydrogen fluoride is produced on precipitation of the uranyl fluoride and may be used for dissolving more hexafluoride.

An example of a preferred way of carrying out the process of the invention will now be described.

One part of uranium hexafluoride is dissolved in twelve parts of liquid anhydrous hydrogen fluoride at 10° C. and one atmosphere pressure. The solution is cooled to −5° C. and mixed with 0.164 part of the azeotrope of hydrogen fluoride and water (38% HF) also cooled to −5° C. Heat is generated and the temperature rises to 10–15° C. as 0.91 part of uranyl fluoride are precipitated.

The uranyl fluoride is filtered off and the filtrate which consists of anhydrous hydrogen fluoride is used to dissolve further quantities of uranium hexafluoride. The make of anhydrous hydrogen fluoride (0.26 part) is removed at intervals, being purified from trace uranyl fluoride, if necessary, by evaporation and condensation.

The precipitated crystals of uranyl fluoride may be passed direct to a reduction kiln or fluidised bed for the production of uranium dioxide without removing the last traces of hydrogen fluoride since these are recovered in the next stage. It has been found that uranium dioxide produced from uranyl fluoride prepared in the manner described in the example is of high density and readily shaped into pellets for use as nuclear fuel.

If it is desired to blend uranium hexafluoride of varying enrichments this may conveniently be done by mixing solutions of the hexafluorides in anhydrous hydrogen fluoride.

All parts in the specification are parts by weight.

I claim:
1. A process for the production of uranyl fluoride from uranium hexafluoride, said process comprising the steps of dissolving uranium hexafluoride in liquid anhydrous hydrogen fluoride, adding water to the solution of uranium hexafluoride in anhydrous hydrogen fluoride to precipitate uranyl fluoride and separating the precipitate of uranyl fluoride from the mother liquor.

2. A process for the production of uranyl fluoride from uranium hexafluoride, said process comprising the steps of dissolving uranium hexafluoride in liquid anhydrous hydrogen fluoride, adding aqueous hydrogen fluoride to the solution of uranium hexafluoride to precipitate uranyl fluoride and separating the precipitate of uranyl fluoride from the mother liquor.

3. A process for the production of uranyl fluoride from uranium hexafluoride, said process comprising the steps of dissolving uranium hexafluoride in liquid anhydrous hydrogen fluoride, adding the azeotrope of hydrogen fluoride and water to the solution of uranium hexafluoride in anhydrous hydrogen fluoride to precipitate uranyl fluoride and separating the precipitate of uranyl fluoride from the mother liquor.

References Cited

UNITED STATES PATENTS 3,235,327   2/1966   Blundell et al. _____ 23—352 X

CARL D. QUARFORTH, *Primary Examiner.*

L. DEWAYNE RUTLEDGE, *Examiner.*

S. TRAUB, R. L. GRUDZIECKI, *Assistant Examiners.*